United States Patent
Lorge et al.

(10) Patent No.: US 11,255,019 B2
(45) Date of Patent: Feb. 22, 2022

(54) PHOTOCATALYTIC DEVICE FOR THE PRODUCTION OF HYDROGEN GAS

(71) Applicant: H2WIN S.A., Nivelles (BE)

(72) Inventors: Philippe Lorge, Nivelles (BE); Claire Remacle, Visé (BE); Stéphanie Gerin, Villers le Bouillet (BE); Nathalie Job, Vaux-sous-Chèvremont (BE); Fabrice Franck, Liège (BE); Giuseppe Caldarella, Ans (BE); Bart Ghysels, Laeken (BE); Damien Godaux, Seraing (BE); Pierre Cardol, Verviers (BE)

(73) Assignee: H2WIN S.A., Nivelles (BE)

( * ) Notice: Subject to any disclaimer, the term of this patent is extended or adjusted under 35 U.S.C. 154(b) by 486 days.

(21) Appl. No.: 16/079,309

(22) PCT Filed: Feb. 17, 2017

(86) PCT No.: PCT/EP2017/053653
§ 371 (c)(1),
(2) Date: Aug. 23, 2018

(87) PCT Pub. No.: WO2017/144368
PCT Pub. Date: Aug. 31, 2017

(65) Prior Publication Data
US 2019/0093240 A1  Mar. 28, 2019

(30) Foreign Application Priority Data
Feb. 23, 2016 (BE) .................................. 2016/5125

(51) Int. Cl.
*C25B 1/55* (2021.01)
*B01J 19/12* (2006.01)
(Continued)

(52) U.S. Cl.
CPC .............. *C25B 1/55* (2021.01); *B01J 19/127* (2013.01); *B01J 23/42* (2013.01); *B01J 31/003* (2013.01);
(Continued)

(58) Field of Classification Search
CPC .. C25B 1/003; C25B 1/04; C25B 9/08; C25B 1/06; C25B 9/10; C25B 11/14;
(Continued)

(56) References Cited

U.S. PATENT DOCUMENTS

| 5,308,454 | A | * | 5/1994 | Anderson | ............... C25B 1/003 |
| | | | | | 204/157.15 |
| 5,608,358 | A | * | 3/1997 | Iseki | ..................... H03B 28/00 |
| | | | | | 204/194 |

(Continued)

FOREIGN PATENT DOCUMENTS

| DE | 102009036180 | 2/2011 |
| WO | 2005007932 | 1/2005 |
| WO | 2015036491 | 3/2015 |

OTHER PUBLICATIONS

Calkins et al., "High photo-electrochemical activity of thylakoid-carbon nanotube composites for photosynthetic energy conversion," Energy Environ. Sci., 2013, 6, 1891 (Year: 2013).*

(Continued)

*Primary Examiner* — Nicholas A Smith
*Assistant Examiner* — Colleen M Raphael
(74) *Attorney, Agent, or Firm* — Hanley, Flight & Zimmerman, LLC

(57) ABSTRACT

Photocatalytic device to dissociate an aqueous phase to product hydrogen gas, said device being set up in such a way that at least one photocatalytic system in contact with said aqueous phase can be irradiated by a light source to produce—through an oxidation reaction in said aqueous (Continued)

phase—oxygen gas, electrons and protons at a means of electron capture, said device comprising:
- a first zone comprising said aqueous phase, and
- a means for reducing said protons set up to carry out a reduction reaction on said protons by said electrons in order to generate hydrogen gas.

said device being characterised in that said means for proton reduction is a proton exchange interface with a front side facing said means of electron capture, and a back side, with only said back side of said proton exchange interface bearing at least one catalyst and/or at least one catalytic system.

17 Claims, 3 Drawing Sheets

(51) Int. Cl.
| | | |
|---|---|---|
| C25B 1/04 | (2021.01) | |
| C01B 3/04 | (2006.01) | |
| C01B 13/02 | (2006.01) | |
| C25B 9/19 | (2021.01) | |
| C25B 9/23 | (2021.01) | |
| C25B 11/00 | (2021.01) | |
| B01J 23/42 | (2006.01) | |
| B01J 31/00 | (2006.01) | |
| B01J 35/00 | (2006.01) | |
| B01J 14/00 | (2006.01) | |
| C25B 11/044 | (2021.01) | |

(52) U.S. Cl.
CPC ............ *B01J 35/004* (2013.01); *C01B 3/042* (2013.01); *C01B 13/0207* (2013.01); *C25B 1/04* (2013.01); *C25B 9/19* (2021.01); *C25B 9/23* (2021.01); *C25B 11/00* (2013.01); *C25B 11/044* (2021.01); *B01J 14/005* (2013.01); *Y02E 60/36* (2013.01)

(58) Field of Classification Search
CPC ...... C01B 3/042; C01B 13/0207; B01J 23/42; B01J 31/003; B01J 35/004; B01J 19/127; B01J 14/005; Y02E 60/366; Y02E 60/364
USPC .................... 204/157.5, 157.52; 205/340
See application file for complete search history.

(56) References Cited

U.S. PATENT DOCUMENTS

| | | | | |
|---|---|---|---|---|
| 9,528,192 | B1* | 12/2016 | Chen | C25B 1/003 |
| 2007/0105013 | A1* | 5/2007 | Rajh | C01B 3/042 |
| | | | | 429/128 |
| 2007/0184309 | A1* | 8/2007 | Gust, Jr. | H01M 4/926 |
| | | | | 429/2 |
| 2010/0143811 | A1* | 6/2010 | Brimblecombe | B01J 35/004 |
| | | | | 205/340 |
| 2010/0200049 | A1* | 8/2010 | Kufryk | C12P 3/00 |
| | | | | 136/252 |
| 2012/0168318 | A1* | 7/2012 | Ueno | C25B 1/003 |
| | | | | 205/340 |
| 2012/0247946 | A1 | 10/2012 | Obenland et al. | |
| 2013/0015076 | A1* | 1/2013 | Yoshida | C25B 1/003 |
| | | | | 205/340 |
| 2013/0240349 | A1* | 9/2013 | Lian | B82Y 30/00 |
| | | | | 204/157.52 |
| 2015/0298100 | A1* | 10/2015 | Hill | C25B 1/003 |
| | | | | 204/242 |
| 2016/0230292 | A1 | 8/2016 | Lorge | |

OTHER PUBLICATIONS

Chatzitakis et al, "Hydrogen production using an algae photoelectrochemical cell," Applied Catalysis B: Environmental 142-143 (2013) 161-168 (Year: 2013).*

Hambourgeretal, "[FeFe]-Hydrogenase-Catalyzed H2 Production in a Photoelectrochemical Biofuel Cell," J. Am. Chem. Soc. 2008, 130, 2015-2022 9 2015 (Year: 2008).*

Joo et al., "Hydrogen evolution in enzymatic photoelectrochemical cell using modified seawater electrolytes produced by membrane desalination process," Solar Energy Materials & Solar Cells 93 (2009)1555-1561 (Year: 2009).*

Shim et al., "Photocurrent by anodized TiO2 photoelectrode for enzymatic hydrogen production and chromium(VI) reduction," International Journal of Hydrogen Energy 33 ( 2008 ) 5193-5198 (Year: 2008).*

Yoon etal, "Use of anodized tubular TiO2 photoanodes in light-sensitized enzymatic hydrogen production," Res Chem. Intermed. (2009) 35:287-297 (Year: 2009).*

International Searching Authority, "International Search Report and Written Opinion," issued in connection with PCT patent application No. PCT/EP2017/053653, dated Apr. 4, 2017, 16 pages.

Herrero et al., "Artificial systems related to light driven electron transfer processes in PSII," Coordination Chemistry Reviews, vol. 252, Issues 3-4, Feb. 2008, abstract retrieved from https://www.sciencedirect.com/science/article/pii/S0010854507001919?via%3Dihub, on Aug. 23, 2018, 3 pages.

Rezaei, "Effects of Water on Enzyme Performance with an Emphasis on the Reactions in Supercritical Fluids," 2007, 14 pages.

Zaks et al., "The Effect of Water on Enzyme Action in Organic Media," Jun. 15, 1988, 5 pages.

\* cited by examiner

PHOTOCATALYTIC DEVICE FOR THE PRODUCTION OF HYDROGEN GAS

This patent is a nationalization of International Patent Application PCT/EP2017/053653, which was filed Feb. 17, 2017 and titled "Dispositif photo-catalytique pour la production d'hydrogéne gazeux" ("Photocatalytic device for the production of gaseous hydrogen"), which claims priority to Belgian Patent Application BE 2016/5125, which was filed on Feb. 23, 2016 and titled "Dispositif photo-catalytique pour la production d'hydrogéne gazeux", both of which are hereby incorporated by reference in their entireties.

This invention concerns a photocatalytic device to dissociate an aqueous phase to produce hydrogen gas, said device being set up in such a way that at least one photocatalytic system in contact with said aqueous phase can be irradiated by a light source to produce, through an oxidation reaction in said aqueous phase, oxygen gas, electrons and protons at a means of electron capture, said device comprising:
- a first zone comprising said aqueous phase, and
- a means for reducing said protons set up to carry out a reduction reaction on said protons by said electrons in order to generate hydrogen gas.

In the sense of this invention, the term "photocatalytic system" means a system comprising at least one photo-enzyme and/or its coenzymes as well as any photocatalyst that can carry out an oxidation reaction on an aqueous phase.

In the sense of this invention, the term "aqueous phase" means a phase containing only water or any phase containing water with at least one additive, e.g. an electrolyte (buffer), a mediator of electron transport or an electron acceptor.

The first purpose of developing such devices is to be able to provide green, renewable energy using a light source (e.g. sunlight), trying to dispense at least partially with any other energy input to make the photocatalytic device work.

Such a photocatalytic device is known from the background art and is used to obtain, using light energy and water, hydrogen in the form of gas ($H_{2\,gas}$). More particularly, such a device allows the generation of hydrogen gas by carrying out (1) a photocatalytic oxidation reaction (e.g. a photo-enzymatic reaction) on an aqueous solution that gives rise to the release of oxygen gas ($O_{2\,gas}$), electrons ($e^-$) and protons ($H^+$), and (2) a reduction reaction in which said protons ($H^+$) are reduced by said electrons ($e^-$), this reaction generating hydrogen in gaseous form ($H_{2\,gas}$).

In such a photocatalytic cell or device and more particularly in a photo-enzymatic cell or device, oxidation of the aqueous solution typically proceeds at a photo-anode comprising an electrochemical interface (e.g. made of carbon) and a photocatalytic system (in particular photo-enzymes) which, when illuminated, is activated and dissociates water molecules. Typically, this photocatalytic system, e.g. photo-enzymes, constitutes the coating on the anode.

To this end, in a photo-enzymatic cell (a particular type of photocatalytic cell), Photosystem II (PSII) can be used as the photo-enzyme. PSII is a naturally-occurring protein complex which catalyses the hydrolysis (photolysis or oxidation) of water in the chloroplasts in plant cells for photosynthesis. In the course of photosynthesis and in photo-enzymatic devices that dissociate water, water is dissociated according to the following equation:

in which hν corresponds to light, $H_2O$ is water, $H^+$ represents a proton and $e^-$ represents an electron, the photo-enzymes being by way of example the PSII enzyme complex.

In this first reaction, photo-enzymes like the PSII enzyme complex can dissociate water and generate oxygen ($O_{2\,gas}$), free protons ($H^+$) and electrons ($e^-$) under the influence of light. Electrons in the aqueous solution are ultimately taken up by an electron acceptor (e.g. 2,5-dichloro-1,4-benzoquinone or DCBQ) that transports them to the anode. When the anode is electrically connected to a cathode composed of an electrochemical interface (e.g. made of platinum and/or comprising hydrogenase-like enzymes), the electrons are transported to the latter. In parallel, the protons too diffuse through the aqueous phase to the cathode (i.e. a means for reducing protons). It is at the cathode that the electrons and protons generated by the photo-enzyme-catalysed dissociation of water molecules finally combine to generate hydrogen gas in a reaction in which the protons are reduced according to the second reaction, as follows:

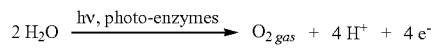

Hydrogen gas ($H_{2\,gas}$) is therefore finally obtained and can be extracted from the photo-enzymatic (photocatalytic) device with a view, by way of example, for storage.

Such photo-enzymatic devices, being a particular type of photocatalytic device, are known from the background art and are generally composed of two electrodes, e.g. in the form of grids made of platinum and/or carbon immersed in the same aqueous solution and connected to one another, e.g. via a potentiostat. With the currently known photo-enzymatic devices that dissociate water, this potentiostat (or any other suitable apparatus) must always provide additional, non-negligible energy potential (referred to as over-potential or bias potential) that adds onto the initial energy potential of the electrons at the anode. In practice, it appears that with the photo-enzymatic devices currently known from the background art in which the electrodes are for example in the form of carbon grids, such additional energy potential (e.g. provided in the form of an electric potential) is indispensable to the production of hydrogen gas. More particularly, such additional energy potential is indispensable for transfer to the cathode (means of proton reduction) of electrons produced at the anode, thereby allowing the reduction of the protons $H^+$ by said electrons $e^-$ to generate hydrogen gas at the cathode.

It turns out that electrons from the water are confronted with a transmission cascade and various interfaces before they can reach the anode and then the cathode, each of these transmissions and each of these interfaces consuming some part of the electron's energy.

In consequence, with current devices, non-negligible additional energy potential has to be provided (of volt magnitude) to give the electrons enough energy to overcome all these transmissions and get through all these interfaces. It is therefore essential to provide non-negligible additional energy potential, e.g. using a potentiostat, so that the electrons have enough energy to reach the cathode to be able to reduce the protons there to hydrogen gas. However, this is contrary to the primary purpose of this type of photo-enzymatic (photocatalytic) device which is to generate hydrogen gas exclusively using a luminous energy source without a need for any other energy source or only using such a source to a limited extent. In practice, since the energy consumed by the device and the device's energetic yield have to be measured globally, it seems that, for current photo-enzymatic devices, this net energy and energetic yield always result from the sum of the light energy derived from the light source and the electrical energy consumed, e.g. by the potentiostat.

It is also noted that the background art also contains photocatalytic devices that use photocatalysts other than photo-enzymes.

From all this, it unfortunately emerges that, with photocatalytic devices and in particular current photo-enzymatic devices, non-negligible additional energy potential (over-potential) of volt magnitude has to be supplied to be able to generate hydrogen gas meaning that a source of non-negligible additional energy is required. It follows that overall energy balance and global energy yield are not optimal since two different energy sources have to be combined to generate hydrogen gas, one luminous and the other electrical.

There is therefore a real need for a photocatalytic device to generate hydrogen gas which does not need an additional energy source (e.g. an additional electrical energy source) or which at least considerably reduces the amount of over-potential required by the device.

To overcome this problem, the invention provides for a photocatalytic device to dissociate an aqueous phase and generate hydrogen gas as indicated at the beginning, said device being characterised in that said means for proton reduction is a proton exchange interface with a front side facing said means of electron capture, and a back side, with only said back side of said proton exchange interface bearing at least one catalyst and/or at least one catalytic system.

In the sense of this invention, the terms "catalyst" and "catalytic system" mean any agent or set of agents that can catalyse an oxidation and/or reduction reaction.

In the sense of this invention, the phrase "only said back side of said proton exchange interface bearing at least one catalyst and/or at least one catalytic system" means that only the back side of the proton exchange interface is doped with at least one catalyst and/or at least one catalytic system.

According to the invention, the proton exchange interface (e.g. a membrane), also referred to as polymer electrolyte membrane (PEM), is an interface that allows the conduction of protons without allowing the passage of gases like bimolecular oxygen or hydrogen.

Surprisingly, in the context of this invention, it has been shown that such a device, the proton capture means of which is a proton exchange interface with a front side pointing towards said means of electron capture and a back side which is the only side bearing at least one catalyst and/or at least one catalytic system, makes it possible to considerably reduce or even dispense with the additional energy potential (over-potential). In practice, it was discovered that the device according to the invention makes it possible to reduce the over-potential provided to the system by at least one-third when the device according to the invention is in use.

More particularly, in the context of this invention it was determined that less over-potential needs to be applied when protons reaching the proton exchange interface are taken up at the latter's front side and then transported across the proton exchange interface to reach its back side where the protons are directly reduced as long as only the back side of this proton exchange interface bears at least one catalyst and/or at least one catalytic system.

Preferably according to the invention, said photocatalytic system is a system comprising at least one photo-enzyme and/or its coenzymes or a system comprising any photocatalyst capable of supporting an oxidation reaction on an aqueous phase.

Advantageously according to the invention, said at least one photocatalytic system is at least one photo-enzyme being the PSII enzyme complex isolated away from the PSI enzyme complex and/or other thylakoid proteins. The PSII enzyme complex can be extracted from the thylakoid membranes of photosynthetic organisms and it could be purified and/or isolated from the Photosystem I (PSI) complex and other enzyme complexes.

Possibly, the PSII complex could be a synthetic complex produced in a PSII production process.

Preferably according to the invention, said at least one photocatalytic system in contact with said aqueous phase constitutes the coating of a first electrode, in particular the coating of an anode. Nevertheless, in the context of this invention it is planned that the photocatalytic system, e.g. photo-enzymes, could simply be in contact with the aqueous phase or in a form such that it can be confined to a specific part of the aqueous phase.

Preferably according to the invention, said means of electron capture may or may not include at least one catalyst and/or at least one catalytic system other than the photocatalytic system.

Advantageously according to the invention, said at least one catalyst and/or said at least one catalytic system other than the photocatalytic system contains hydrogenase-like enzymes and/or particles of platinum. It has been determined that hydrogenase-like enzymes—in addition to being cheaper than platinum—can not only handle more electrons per unit time (per second) but also somewhat cuts down the energy potential required by the device to generate hydrogen gas. The above-mentioned hydrogenase-like enzymes could be produced by synthesis rather than extracted from naturally-occurring organisms.

Preferably according to the invention, said means of electron capture is a proton exchange interface or a carbon grid.

Advantageously according to the invention, said proton exchange interface constitutes a separator between said first zone containing the aqueous phase and a second non-aqueous phase.

In the sense of this invention, the term "second non-aqueous phase" means for example a zone comprising a solid phase or a non-aqueous liquid phase or a zone with no liquid phase.

Preferably according to the invention, said separator does not let either said liquid phase or gases (in particular $O_2$) pass but it does let protons through. In one embodiment, such a separator according to the invention ensures that the reduction reaction only proceeds in the non-aqueous zone. In this case, it is planned according to the invention that the front side of the separator (e.g. the interface in the form of a membrane with both a front side and a back side) is in contact with the aqueous phase or in direct contact with the anode and therefore positioned on the first aqueous zone side. Thus it is planned that the back side that is doped with catalyst (e.g. carbon or platinum) is positioned on the second non-aqueous zone side. The reaction in which protons are reduced by electrons to generate hydrogen gas only proceeds at the back side of the interface (membrane) and therefore exclusively on the second non-aqueous zone side. This is possible if, as stated above, the separator (membrane) does not let the aqueous phase through but lets protons pass into the second non-aqueous zone with protons only reduced at the back side of this separator (interface) and therefore in the second non-aqueous zone. In the context of this invention, it has been determined that reducing protons in a non-aqueous zone optimises intensity (the magnitude/amplitude of the current) when a given energy potential is applied to the system.

Advantageously, according to the photocatalytic device for dissociating an aqueous phase to generate hydrogen gas in line with the invention, a means of contact is present on said means of electron capture and/or on said means for proton reduction. For example, carbon fabric is planned to provide optimal electrical contact between said means of electron capture and said means for proton reduction, e.g. via a potentiostat.

Preferably according to the invention, said aqueous phase is a phase containing only water or any phase containing water with at least one additive, e.g. an electrolyte, a mediator of electron transport or an electron acceptor.

Advantageously according to the invention, said aqueous phase also contains a mediator of electron transport or an electron acceptor. By way of example, said mediator of electron transport or electron acceptor could be a derivative of quinone, preferably 2,6-dimethylebenzoquinone, 2,6-dichloro-p-benzoquinone or 1,4-benzoquinone. Possibly, said mediator of electron transport or said electron acceptor is in the form of carbon nanotubes or ferricyanide.

Preferably according to the invention, said aqueous phase has a pH of between 4 and 8, and more preferably still between 6 and 7.

Advantageously, the photocatalytic device to dissociate an aqueous phase to generate hydrogen gas according to the invention also includes an additional device to recover and remove the gas. For example, this could take the form of a device that ensures the flow of nitrogen in said second non-aqueous zone in order to recover and remove gases present in said second non-aqueous zone, notably the hydrogen gas produced by the reduction of protons in this second non-aqueous zone.

Advantageously, the photocatalytic device to dissociate an aqueous phase to generate hydrogen gas according to the invention also includes an additional device to detect hydrogen gas.

Advantageously, the photocatalytic device to dissociate an aqueous phase to generate hydrogen gas according to the invention also includes a potentiostat.

Preferably according to the invention, said light source is located in the aqueous phase. In practice, rather than having a light source outside the photocatalytic device, it could be submerged in the aqueous phase. In this case, photons no longer need to cross the photocatalytic device's front wall which enhances the device's efficiency. For example, optic fibre could be used for this purpose.

Advantageously, said mediator of electron transport or said electron acceptor is in the aqueous phase at a concentration of between 1 picoM and 1 M. Advantageously, said mediator of electron transport or said electron acceptor is in the aqueous phase at a concentration of between 10 μM and 1 mM. Preferably, for photosynthetic organisms, PSII is found in an aqueous phase at a concentration of between 1 μg Chl/cm$^2$ and 1 g Chl/cm$^2$, preferably between 20 μg Chl/cm$^2$ and 200 μg Chl/cm$^2$. In the sense of the invention, PSII concentrations have traditionally been expressed with respect to total chlorophyll concentration (Chl). By total chlorophyll concentration in the sense of the invention, it is the concentration of both chlorophylls A and B. When the photosynthetic organism does not contain chlorophyll, the presence of PSII in the aqueous phase is quantified, according to the invention, by assaying pheophytin.

Other embodiments of the device according to the invention are described in appended Claims.

Another object of the invention is a process for producing hydrogen gas with a photocatalytic device according to the invention, said process comprising the following steps:

irradiation of at least one photocatalytic system in contact with an aqueous phase present in a first zone, by a light source, in order to generate oxygen gas, electrons and protons via an oxidation reaction in said aqueous phase at a means of electron capture, and capture of said protons at a proton exchange interface with a front side facing said means of electron capture and a back side with at least one catalyst and/or at least one catalytic system, so said protons are reduced to gaseous hydrogen in a reduction reaction on said protons by said electrons at said back side of said proton exchange interface.

Other embodiments of the process according to the invention are described in appended Claims.

The invention also concerns use of a photocatalytic device according to the invention to produce hydrogen gas from an aqueous phase and a light source.

Other uses of a photocatalytic device according to the invention are described in appended Claims.

Other characteristics, details and advantages of the invention will emerge from the description hereafter which is non-limiting and makes reference to the appended Figures.

The same components are labelled in the same way in the different Figures.

Figure 1:
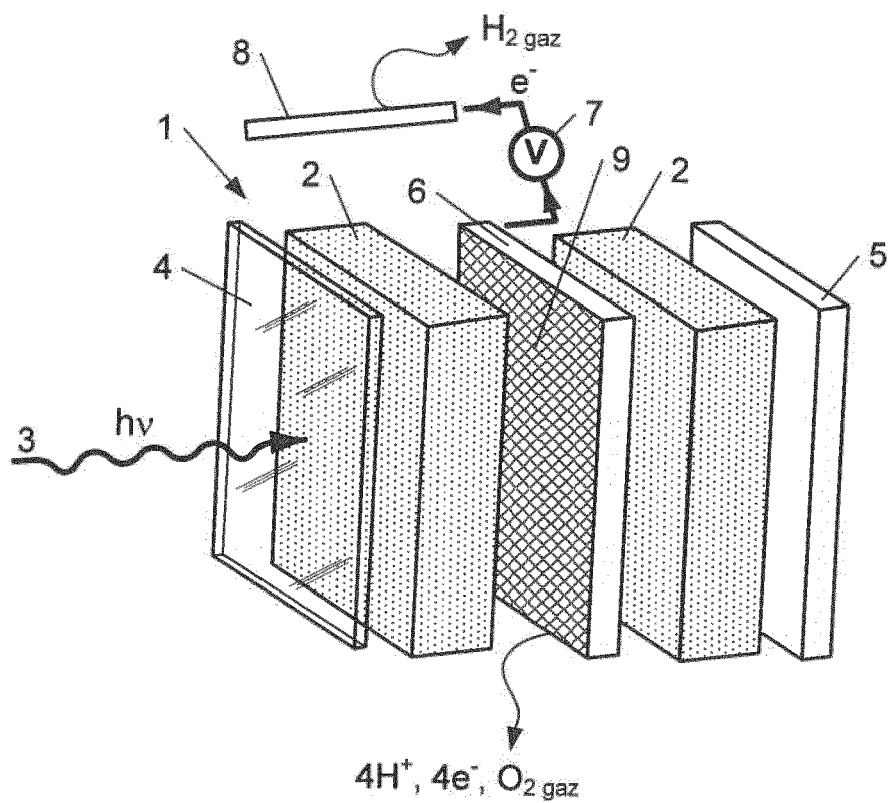
FIG. 1 is an exploded view of a photocatalytic device known to the background art that produces hydrogen gas from an aqueous phase and a light source.

FIG. 1 illustrates a device 1 from the background art that produces hydrogen gas ($H_{2\,gas}$) from an aqueous phase 2 and a light source 3. This device 1 has a front wall 4 that lets pass photons coming from the light source 3 to irradiate a photocatalytic system 9 in contact with the aqueous phase 2. This device also has a back wall 5, e.g. a back wall 5 made of a suitable polymer. Of course, the device 1 also has top, bottom and side walls that, together with the front and back walls, create a watertight device (generator). For example, the front wall 4 could be made of glass although any suitable material that lets photons coming from the light source 3 irradiate the photocatalytic system 9 in contact with the aqueous phase 2 is covered by this invention.

The aqueous phase 2 bathes an anode 6 (e.g. a carbon anode 6) containing photo-enzymes such as PSII as the photocatalytic system 9, connected through a potentiostat 7 to a cathode submerged in the same aqueous phase 2. A photocatalytic system in the form of photo-enzymes 9 forms a coating on the anode 6 and is carried thereon in such a way that it is activated by incoming photons: under the influence of light (photons), the photo-enzymes 9 (e.g. PSII enzyme complexes) will catalyse an oxidation reaction on the aqueous phase 2 to generate oxygen gas ($O_{2\ gas}$), electrons ($4\ e^-$) and free protons ($4\ H^+$).

Preferably, aqueous phase 2 contains a mediator of electron transport (or electron acceptor) (e.g. DCBQ) that takes the electrons to the anode 6 in such a way that, since the latter is electrically connected to the cathode 8 via a potentiostat 7, the electrons can travel to the cathode and there combine with protons which will also have reached the cathode 8 via the aqueous phase 2. At the cathode 8, a reduction reaction proceeds in which protons $H^+$ are reduced by electrons $e^-$ to generate hydrogen gas ($H_{2\ gas}$).

Figure 2:
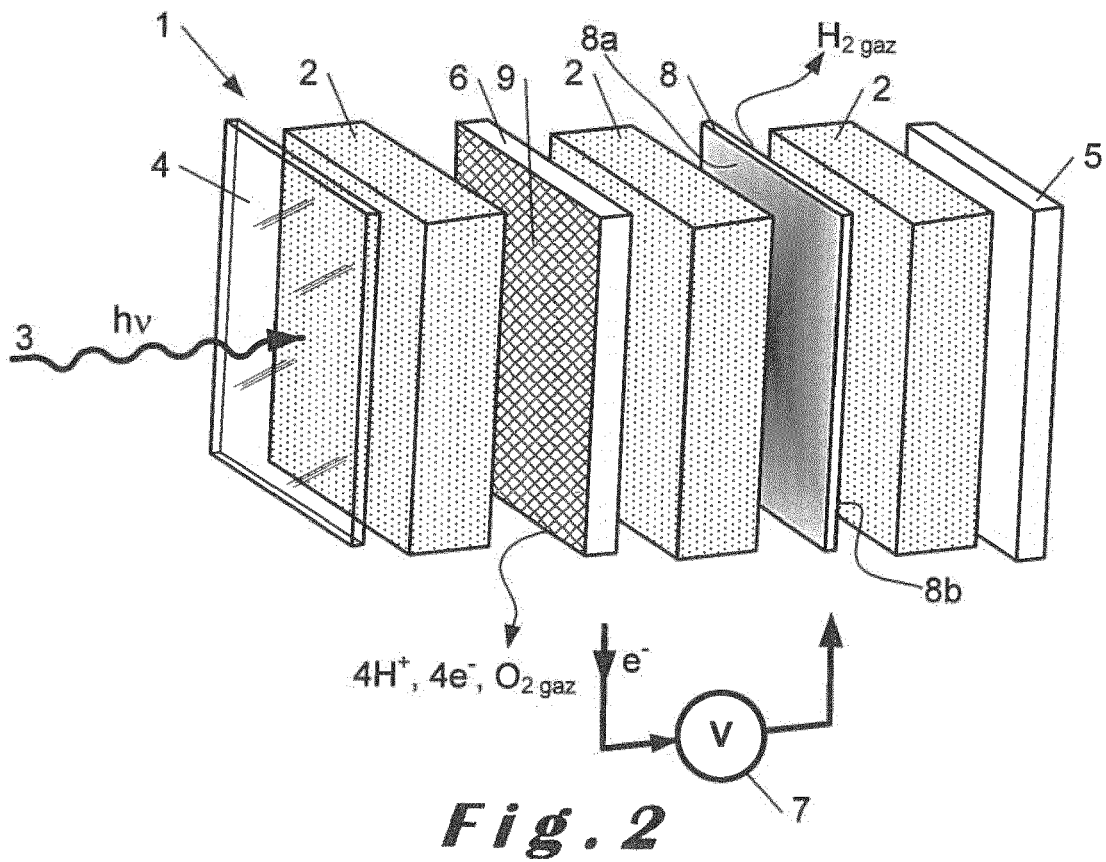
FIG. 2 is an exploded view of a photocatalytic device according to the invention that produces hydrogen gas from an aqueous phase and a light source.

FIG. 2 illustrates a device 1 according to the invention to generate hydrogen gas ($H_{2\ gas}$) from an aqueous phase 2 and a light source 3, which could for example be a red LED or halogen light source. This device 1 has a front wall 4 that lets pass photons coming from the light source 3 to irradiate a photocatalytic system 9 in contact with the aqueous phase 2. This device also has a back wall 5, e.g. a back wall 5 made of a suitable polymer. Of course, the device 1 also has top, bottom and side walls that, together with the front and back walls, create a watertight device (reactor). For example, the front wall 4 could be made of glass although any suitable material that lets photons coming from the light source 3 irradiate the photocatalytic system 9 in contact with the aqueous phase 2 is covered by this invention.

The aqueous phase 2 bathes an anode 6 (e.g. a carbon anode 6) containing photo-enzymes (e.g. PSII complexes) connected through a potentiostat 7 to an interface in the form of a proton exchange membrane 8 with a front side 8a facing said means of electron capture 6 and its back side 8b containing at least one catalyst and/or at least one catalytic system, with the membrane (interface) 8 also submerged in the same aqueous phase 2. A photocatalytic system in the form of photo-enzymes 9 forms a coating on the anode 6 and is carried thereon in such a way that it is activated by incoming photons: under the influence of light (photons), the photo-enzymes 9 (e.g. PSII enzyme complexes) will catalyse an oxidation reaction on the aqueous phase 2 to generate oxygen gas ($O_{2\ gas}$), electrons ($4\ e^-$) and free protons ($4\ H^+$). More particularly, the membrane (interface) 8 has a front side 8a in contact with the aqueous phase 2 and a back side 8b (also in contact with aqueous phase 2) which is doped with platinum so that it can act as a cathode. The reaction in which the protons ($H^+$) are reduced by electrons ($e^-$) to generate hydrogen gas ($H_{2\ gas}$) only proceeds on the back side 8b of the membrane (interface) 8.

Preferably, aqueous phase 2 contains a mediator of electron transport or electron acceptor (e.g. DCBQ) that takes the electrons to the anode 6 in such a way that, since the latter is electrically connected to the cathode 8 via a potentiostat 7, the electrons can reach the membrane (interface) 8 and there combine with protons which will also have reached the membrane (interface) 8 via the aqueous phase 2. On the back side of the membrane (interface) 8, a reduction reaction proceeds in which protons $H^+$ are reduced by electrons $e^-$ to generate hydrogen gas ($H_{2\ gas}$). Possibly, carbon fabric (Gas Diffusion Layer—GDL) could be placed on the back side 8b (facing wall 5) of the membrane (interface) 8 (doped and acting as a cathode) to create an electrical contact layer between membrane (cathode) 8 and potentiostat 7.

Figure 3:
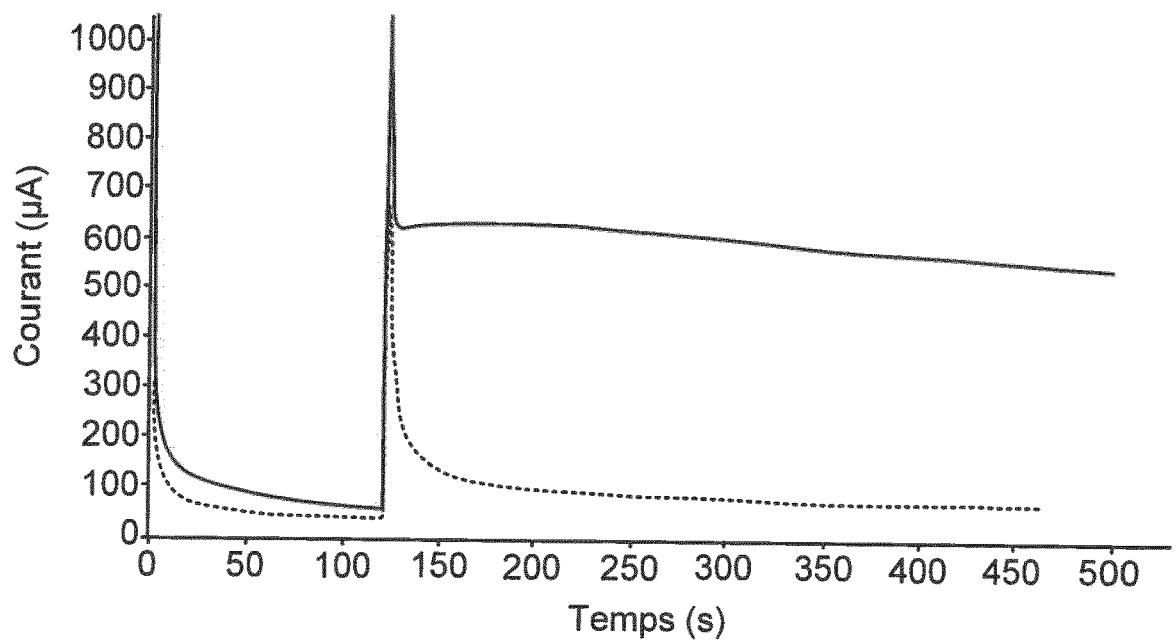
FIG. 3 illustrates a time course for the device illustrated in FIG. 2 containing a proton exchange interface doped with platinum (continuous line) or an undoped proton exchange interface with a platinum grid (broken line), showing the amount of current passing from anode to cathode when an over-potential of 0.6 V is applied by means of a potentiostat.

FIG. 3 illustrates a time course for a device as illustrated in FIG. 2 containing either a proton exchange interface doped with platinum according to the invention (continuous line) or an undoped proton exchange interface with a platinum grid according to the background art (broken line), showing the amount of current passing from anode to cathode when an over-potential of 0.6 V is applied by means of a potentiostat. For these experiments, a halogen light source emitting 600 µmoles of useful photons at the photosynthetic/($s \cdot m^2$) system was used to irradiate the aqueous phase 2 (when a red LED light source emitting 600 µmoles of useful photons at the photosynthetic/($s \cdot m^2$) system was also used for experiments, the results were identical.) In addition, for these experiments, the aqueous phase 2 contained DCBQ (0.75 mM) as mediator of electron transport and a buffer (NaCl 50 mM, MES 20 mM, $MgCl$ 2 mM) with the anode 6 made of carbon carrying PSII photo-enzymes 9 (30 µg Chl/$cm^2$).

As long as the area under each curve can be considered as proportional to the amount of hydrogen produced ($H_{2\ gas}$), the results clearly show that, when a given additional energy potential (over-potential) of 0.6 V was applied to the system, more hydrogen gas ($H_{2\ gas}$) was produced if the device had a doped proton exchange interface as cathode, compared with a device with an undoped proton exchange interface and a platinum grid.

Figure 4:
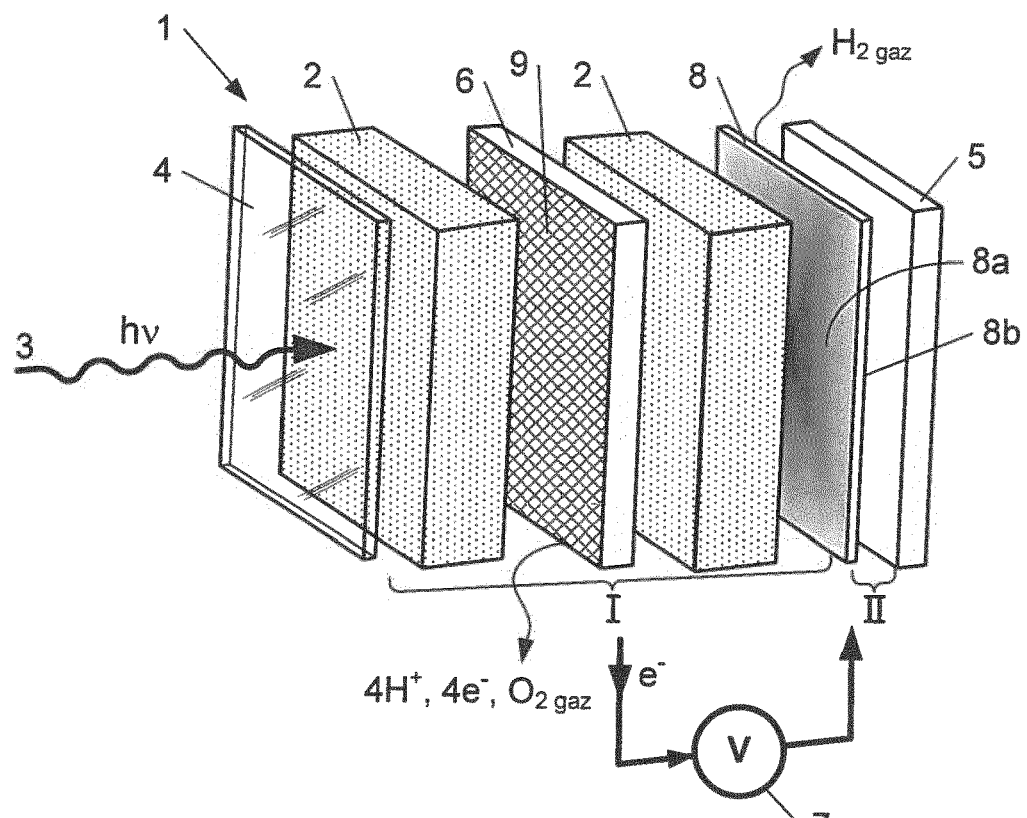
FIG. 4 is an exploded view of another photocatalytic device according to the invention that produces hydrogen gas from an aqueous phase and a light source.

FIG. 4 illustrates a photocatalytic device 1 according to the invention to generate hydrogen gas ($H_{2\ gas}$) from an aqueous phase 2 and a light source 3, which could for example be a red LED or halogen light source. This device 1 according to the invention comprises the same components as those described and illustrated in FIG. 2 but this device 1 according to the invention as illustrated in FIG. 4 has a first aqueous zone I and a second non-aqueous zone II. According to this embodiment, an interface in the form of a platinum-doped PEM-type membrane 8 constitutes a separator between the first aqueous zone I and the second non-aqueous zone II. Doping the back side of the membrane (interface) 8 with carbon and platinum turns it into a cathode. This separator in the form of a membrane (interface) 8 blocks passage of both the aqueous phase 2 and gases but lets protons ($H^+$) through from said aqueous zone I into said non-aqueous zone II. More particularly, this membrane (separator) has a front side 8a in contact with the aqueous phase 2 and faces towards the side of the first aqueous zone I. This membrane (separator) also has a back side 8b which is doped with platinum in such a way that it can act as a cathode. Since this back side 8b faces the side of the second non-aqueous zone II, the reaction in which protons ($H^+$) are reduced by electrons ($e^-$) to generate hydrogen gas ($H_{2\ gas}$) only proceeds at the back side 8b of the separator (membrane) and therefore only on the side of the non-aqueous zone II. Possibly, carbon fabric (Gas Diffusion Layer—GDL) could be placed on the back side 8b (facing wall 5) of the membrane (interface) 8 (doped and acting as a cathode) to create an electrical contact layer between cathode 8 and potentiostat 7.

Figure 5:
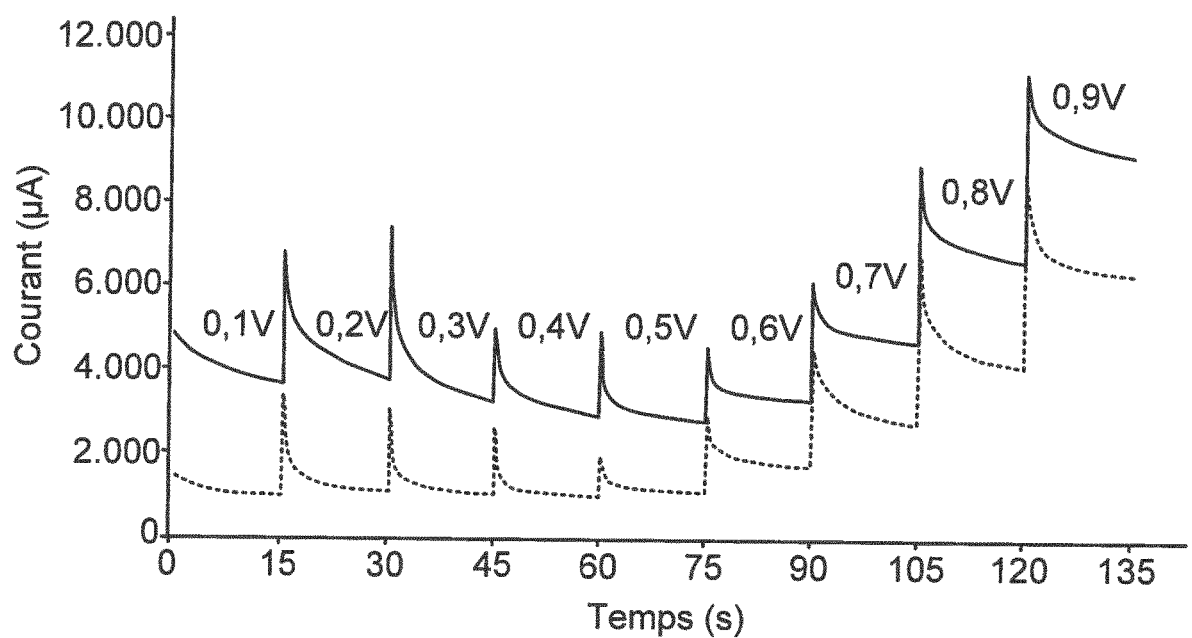
FIG. 5 shows a graph comparing results recorded in ampero-multivoltage measurements (from 0.1 V to 0.9 V) for devices according to the invention as illustrated in FIG. 2 (broken line) and FIG. 4 (broken line) with a doped proton exchange interface.

FIG. 5 shows a graph comparing results recorded in ampero-multivoltage measurements (from 0.1 V to 0.9 V) for devices according to the invention as illustrated in FIG. 2 (broken line) and FIG. 4 (broken line). For each of these embodiments illustrated in FIGS. 2 and 4, a proton exchange membrane (PEM interface) doped with platinum (on its back side) acts as a cathode. As shown by the graph, the current (ρA) is higher on the application of a given potential to the system, when the system includes a proton exchange interface doped with platinum and separating a first aqueous zone from a second non-aqueous zone (the embodiment shown in FIG. 4). In this graph, the embodiment according to FIG. 4 is compared to a device according to FIG. 2 which contains no non-aqueous zone. It follows on from this that current intensity is optimised in the embodiment according to the invention illustrated in FIG. 4 with a non-aqueous zone in which the proton reduction reaction proceeds. This implies more intense $H_{2\,gas}$ production for a given, pre-set applied energy potential, compared with a device according to the invention without any non-aqueous zone.

For these experiments, a halogen light source emitting 600 µmoles of useful photons at the photosynthetic/(s·m$^2$) system was used to irradiate the aqueous phase 2. (When a red LED light source emitting 600 µmoles of useful photons at the photosynthetic/(s·m$^2$) system was also used for experiments, the results were identical.) In addition, for these experiments, the aqueous phase 2 contained DCBQ (0.75 mM) as mediator of electron transport and a buffer (NaCl 50 mM, MES 20 mM, MgCl 2 mM) with the anode 6 made of carbon carrying PSII photo-enzymes 9 (30 µg Chl/cm$^2$). Moreover, for the embodiment illustrated in FIG. 4, an extra device was included to recover and remove gases from the non-aqueous zone.

Figure 6:
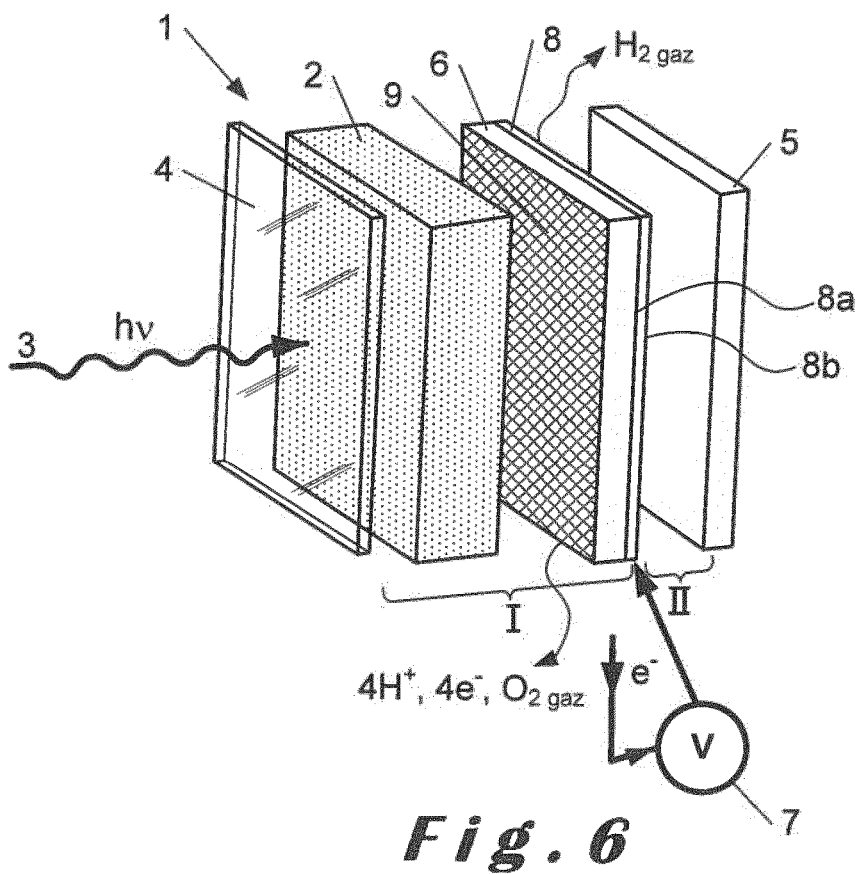
FIG. 6 is an exploded view of another photocatalytic device according to the invention that produces hydrogen gas from an aqueous phase and a light source.

FIG. 6 is a view of another photocatalytic device according to the invention that produces hydrogen gas ($H_{2\,gas}$) from an aqueous phase 2 and a light source 3. This device 1 is identical to that illustrated in FIG. 4 apart from the fact that the membrane (interface) 8 is juxtaposed against the back side of the anode 6. The membrane (interface) 8 constitutes a separator between the first aqueous zone I and the second non-aqueous zone II, and it is doped with carbon and platinum so that it can act as a cathode. This separator in the form of a membrane (interface) 8 blocks passage of both the aqueous phase 2 and gases but lets protons (H$^+$) through. More particularly, this membrane (interface) 8 has a front side 8a in direct contact with the anode 6 (because it is juxtaposed against the back side of the anode 6), and said front side faces onto the side of the first aqueous zone I. This membrane (interface) 8 also has a back side 8b which is doped with platinum so that it can act as a cathode, and said back side faces onto the side of the second non-aqueous zone II. The reaction in which the protons (H$^+$) are reduced by electrons (e$^-$) to generate hydrogen gas ($H_{2\,gas}$) only proceeds in this non-aqueous zone II at the back side 8b of the membrane 8. Possibly, carbon fabric (Gas Diffusion Layer—GDL) could be placed on the back side 8b (facing wall 5) of the membrane (interface or separator) 8 (doped and acting as a cathode) to create an electrical contact layer between cathode 8 and potentiostat 7.

According to this embodiment according to the invention as illustrated in FIG. 6, the reduction reaction proceeds in the non-aqueous zone II but, in addition, protons generated in the aqueous phase in the oxidation reaction are directly taken up at the membrane (interface) 8 without having to cross any aqueous phase as is the case with the embodiment according to the invention as illustrated in FIG. 4. In this case, the protons do not return into an aqueous phase again: they are directly taken up at the membrane (interface) 8 that acts as a cathode 8 in the non-aqueous zone II.

It is fully understood that this invention is in no way limited to the embodiments described above and that modifications could be made without going beyond the scope of the Claims.

The invention claimed is:

1. A photocatalytic device to dissociate an aqueous phase to produce hydrogen gas, the device structured such that a photocatalytic system in contact with the aqueous phase can be irradiated by a light source to produce, through an oxidation reaction in the aqueous phase, oxygen gas, electrons, and protons at an anode for capturing electrons, the device comprising:
   a first zone including the aqueous phase; and
   a cathode for reducing protons to carry out a reduction reaction on the protons by the electrons to generate hydrogen gas;
   said cathode for reducing protons including a proton exchange interface constituting a separator between the first zone containing the aqueous phase and a second non-aqueous zone, said separator blocking passage of the aqueous phase but permitting passage of protons, said separator including:
      a front side positioned in the first zone containing the aqueous phase and facing the anode for capturing electrons; and
      a back side positioned in the second non-aqueous zone and comprising hydrogenase-like enzymes as at least one catalyst and/or at least one catalytic system.

2. The photocatalytic device according to claim 1, wherein the photocatalytic system includes a photo-enzyme and/or its coenzymes or a photocatalyst that can carry out the oxidation reaction on the aqueous phase.

3. The photocatalytic device according to claim 1, wherein the photocatalytic system is at least one of: a photo-enzyme, a PSII enzyme complex isolated away from a PSI enzyme complex, and/or a thylakoid protein.

4. The photocatalytic device according to claim 1, wherein the photocatalytic system in contact with the aqueous phase includes a coating of the anode.

5. The photocatalytic device according to claim 1, wherein the anode includes a catalyst and/or a catalytic system other than the photocatalytic system.

6. The photocatalytic device according to claim 5, wherein the photocatalytic system further includes particles of platinum.

7. The photocatalytic device according to claim 1, wherein the anode includes a carbon grid.

8. The photocatalytic device according to claim 1, further including a means for contacting on the means for capturing electrons anode.

9. The photocatalytic device according to claim 1, wherein the aqueous phase is a phase containing only water, a phase containing water with at least one additive, or a phase containing an electrolyte.

10. The photocatalytic device according to claim 1, wherein the aqueous phase includes a mediator of electron transport or an electron acceptor.

11. The photocatalytic device according to claim 1, wherein the aqueous phase has a pH of between 4 and 8.

12. The photocatalytic device according to claim 1, further including a gas remover.

13. The photocatalytic device according to claim 1, further including a hydrogen gas detector.

14. The photocatalytic device according to claim 1, further including a potentiostat.

15. The photocatalytic device according to claim 1, wherein the light source is contained in the aqueous phase.

16. A method for producing hydrogen gas with the photocatalytic device according to claim 1, the method comprising: irradiating the photocatalytic system in contact with the aqueous phase present in the first zone, by the light source, to generate oxygen gas, electrons, and protons via the oxidation reaction in the aqueous phase at the anode; capturing the protons at the proton exchange interface; reducing the protons to gaseous hydrogen in a reduction reaction on the protons by the electrons at the back side of the proton exchange interface via the aqueous phase at the anode.

17. A method of using the device according to claim 1, the method comprising: dissociating the aqueous phase; and producing the hydrogen gas.

\* \* \* \* \*